US008452962B2

(12) United States Patent
Dill et al.

(10) Patent No.: US 8,452,962 B2
(45) Date of Patent: *May 28, 2013

(54) METHOD AND APPARATUS FOR SIMULATING A WORKFLOW AND ANALYZING THE BEHAVIOR OF INFORMATION ASSURANCE ATTRIBUTES THROUGH A DATA PROVIDENCE ARCHITECTURE

(75) Inventors: Stephen J. Dill, Frederick, MD (US); Bruce Barnett, Troy, NY (US); Andrew Crapo, Scotia, NY (US); Abha Moitra, Scotia, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 515 days.

This patent is subject to a terminal disclaimer.

(21) Appl. No.: 12/652,266

(22) Filed: Jan. 5, 2010

(65) Prior Publication Data
US 2010/0250932 A1    Sep. 30, 2010

Related U.S. Application Data

(60) Provisional application No. 61/162,774, filed on Mar. 24, 2009, provisional application No. 61/253,243, filed on Oct. 20, 2009.

(51) Int. Cl.
*H04L 9/32*    (2006.01)

(52) U.S. Cl.
USPC ............. 713/170; 713/176; 713/181; 726/22

(58) Field of Classification Search
USPC ........................ 726/22–25; 713/168–181, 188
See application file for complete search history.

(56) References Cited

U.S. PATENT DOCUMENTS

| 7,774,845 | B2 * | 8/2010 | Shipman ........................ 726/23 |
| 8,042,181 | B2 * | 10/2011 | Judge .............................. 726/22 |
| 2006/0212712 | A1 * | 9/2006 | Braverman et al. ........... 713/181 |

* cited by examiner

*Primary Examiner* — Nirav B Patel
(74) *Attorney, Agent, or Firm* — Ronald E. Prass, Jr.; Prass LLP

(57) ABSTRACT

A method and apparatus that simulates a workflow and analyzes the behavior of information assurance attributes through a data providence architecture is disclosed. The method may include injecting one or more faults into a simulated workflow, receiving a message in the simulated workflow having a data provenance wrapper, examining each data provenance record of the message and any attachments for discrepancies, identifying any discrepancies in the examination of each data provenance record of the message and any attachments; calculating a degree of trust based on any discrepancies identified in the examination of each data provenance record of the message and any attachments, analyzing the calculated degree of trust with respect to the one or more injected faults and the information assurance attributes, and outputting the analysis to a user.

21 Claims, 7 Drawing Sheets

METHOD AND APPARATUS FOR SIMULATING A WORKFLOW AND ANALYZING THE BEHAVIOR OF INFORMATION ASSURANCE ATTRIBUTES THROUGH A DATA PROVIDENCE ARCHITECTURE

PRIORITY AND RELATED APPLICATION INFORMATION

This application claims priority from U.S. Provisional Patent Application Ser. No. 61/162,774, filed Mar. 24, 2009, and U.S. Provisional Patent Application Ser. No. 61/253,243, filed Oct. 20, 2009, the contents of which are incorporated herein by reference in their entireties.

This application is related to co-filed applications U.S. Pat. No. 8,281,141, issued Oct. 22, 2012, entitled "METHOD AND APPARATUS FOR MONITORING AND ANALYZING DEGREE OF TRUST AND INFORMATION ASSURANCE ATTRIBUTES INFORMATION IN A DATA PROVIDENCE ARCHITECTURE WORKFLOW," U.S. patent application Ser. No. 12/652,298, filed Jan. 5, 2010 (published as 2010/0251367 A1 on Sep. 30, 2010), entitled "METHOD AND APPARATUS FOR PROVIDING INFORMATION ASSURANCE ATTRIBUTES THROUGH A DATA PROVIDENCE ARCHITECTURE," and U.S. Pat. No. 8,166,122, issued Apr. 24, 2012, entitled "METHOD AND APPARATUS FOR GENERATING A FIGURE OF MERIT FOR USE IN TRANSMISSION OF MESSAGES IN A MULTI-LEVEL SECURE ENVIRONMENT," the disclosures of which are hereby incorporated by reference herein in their entireties.

BACKGROUND

1. Field of the Disclosed Embodiments

The disclosed embodiments relate to message integrity verification techniques.

2. Introduction

In conventional communications environments, data provenance involves tracking the origin of data and subsequent transformations performed on the data. This process is useful for "large science" projects in areas like astronomy, genetics, etc. where a large repository of data is continually being modified and it is important to validate and be able to recreate results derived from the data repository.

Information assurance is the practice of managing information-related risks. More specifically, information assurance practitioners seek to protect and defend information and information systems by ensuring confidentiality, integrity, authentication, availability, and non-repudiation. These goals are relevant whether the information is in storage, processing, or transit, and whether threatened by malice or accident. In other words, information assurance is the process of ensuring that authorized users have access to authorized information at the authorized time.

However, while work on data provenance exists, the concept has not been implemented in conventional communication devices for information assurance attributes, such as authenticity, confidentiality, integrity, non-repudiation and availability. Furthermore, no simulation process exists to test and analyze the behavior of information assurance attributes in a data provenance workflow.

SUMMARY

A method and apparatus that simulates a workflow and analyzes the behavior of information assurance attributes through a data providence architecture is disclosed. The method may include injecting one or more faults into a simulated workflow, receiving a message in the simulated workflow having a data provenance wrapper, wherein the message may or may not have attachments and the data provenance wrapper contains a data provenance record with data provenance information for the message and each attachment, the one or more injected faults being included in at least one of the received message, the data provenance information, and at least one of the attachments; examining each data provenance record of the message and any attachments for discrepancies, wherein the examination of each data provenance record of the message and any attachments includes: verifying signatures of senders of the message and any attachments, calculating a hash value for the message and any attachments, verifying that the hash value for the message and any attachments matches the values in the data provenance record for the message and any attachments, verifying the timestamp of the message and any attachments, and verifying information assurance attributes of the message and any attachments, the information assurance attributes being at least one of authenticity, confidentiality, integrity, non-repudiation, and availability, identifying any discrepancies in the examination of each data provenance record of the message and any attachments, calculating a degree of trust based on any discrepancies identified in the examination of each data provenance record of the message and any attachments, analyzing the calculated degree of trust with respect to the one or more injected faults and the information assurance attributes, and outputting the analysis to a user.

BRIEF DESCRIPTION OF THE DRAWINGS

In order to describe the manner in which the above-recited and other advantages and features of the disclosed embodiments can be obtained, a more particular description of the disclosed embodiments briefly described above will be rendered by reference to specific embodiments thereof which are illustrated in the appended drawings. Understanding that these drawings depict only typical disclosed embodiments and are not therefore to be considered to be limiting of its scope, the disclosed embodiments will be described and explained with additional specificity and detail through the use of the accompanying drawings in which.

DETAILED DESCRIPTION

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the present disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

The disclosure may describe a variety of embodiments, such as a method and apparatus and other embodiments that relate to the basic concepts of the disclosed embodiments.

The disclosed embodiments may concern data provenance which involves tracking the origin of data and subsequent transformations performed on it. In particular, the disclosed embodiments may concern simulating a multi-level secure environment where it may not always be possible to pass data source and processing information across security boundaries. Further, the disclosed embodiments may concern the use of data provenance techniques to support information assurance attributes like availability, authentication, confidentiality, integrity and non-repudiation.

The simulation workflow may allow the analysis of the behavior of these information assurance attributes by using data provenance associated with execution of the workflow. The simulation framework may allow easy access to the raw data that would not be possible in an actual implementation built on certain frameworks. The simulation also allows experimentation with different cryptographic techniques that may include hashing, encryption and signatures.

In this process, the simulation architecture may allow the injection of faults to model various threats and attacks, such as malicious attacks, man-in-the-middle, attacks, and replay attacks. These threats and attacks may be modeled in a repeatable manner, for example. The simulation architecture may also allow for the analysis of data provenance information to identify violations as well as pinpoint where in the workflow they may have occurred.

Figure 1:
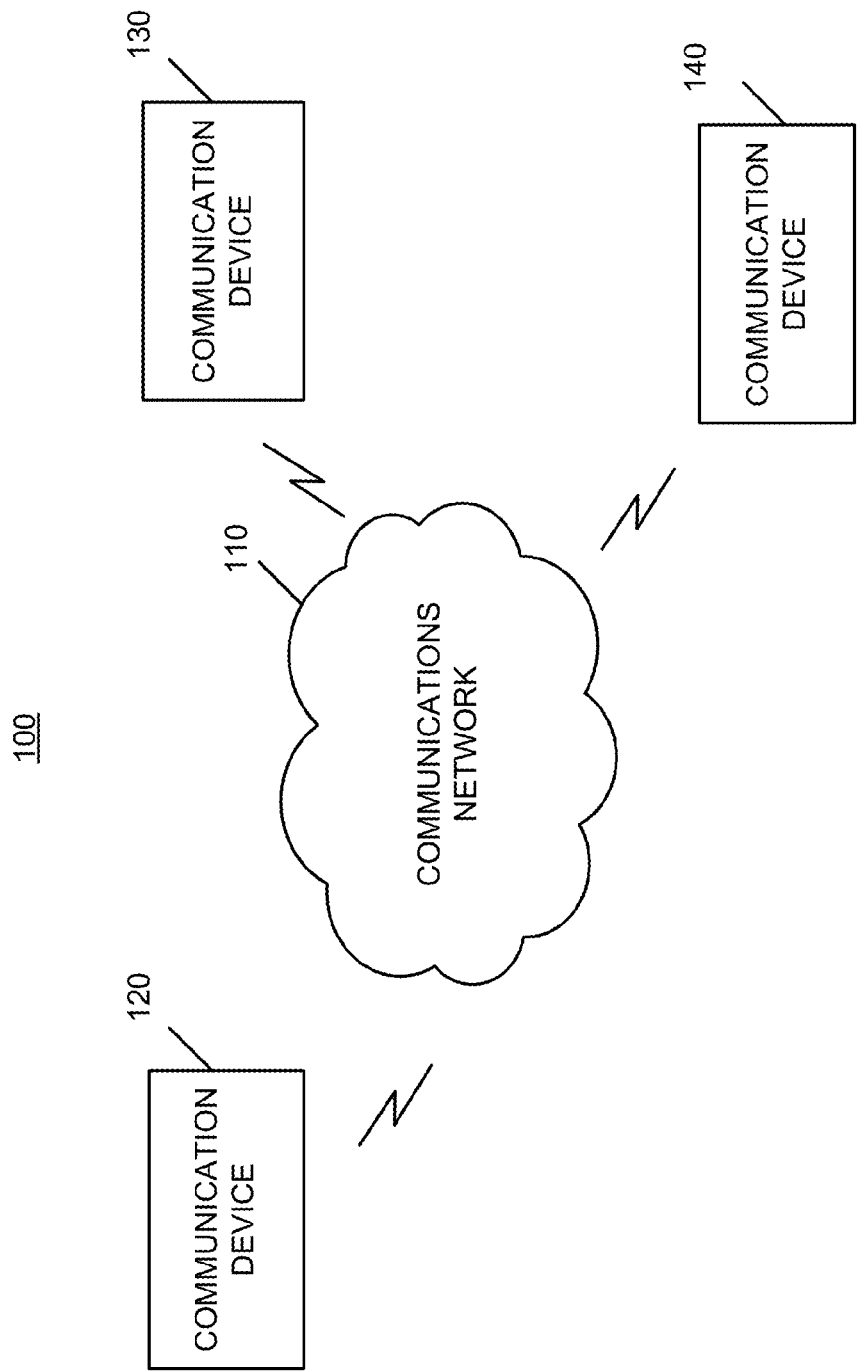
FIG. 1 is an exemplary diagram of a communication network environment in accordance with a possible embodiment of the disclosure.

FIG. 1 is an exemplary diagram of a communication network environment 100 in accordance with a possible embodiment of the disclosure. In particular, the communication network environment 100 may include one or more communication devices 120, 130, 140 which may communicate through communication network 110. Communications network 110 may represent any communications network used to communicate with other entities, including the Internet, an intranet, a radio network, a wireless network, hardwired network, satellite network, etc.

The communication devices 120, 130, 140 may be any device capable of sending and receiving messages and/or attachments, such as a processing device, a mobile communication device, a portable computer, a desktop computer, a server, a network router, a gateway device, or combinations of the above, for example.

Figure 2:
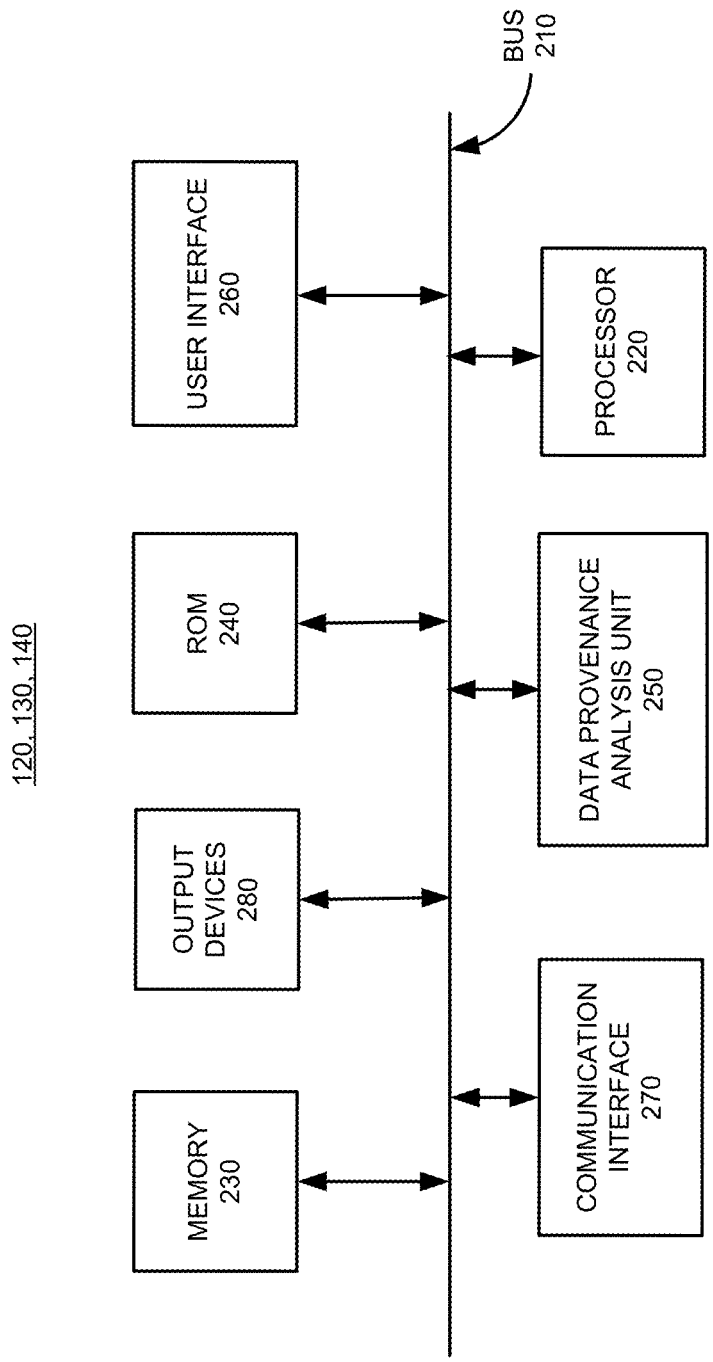
FIG. 2 is a block diagram of an exemplary communication device in accordance with a possible embodiment of the disclosure.

FIG. 2 is a block diagram of an exemplary communication device 120, 130, 140 in accordance with a possible embodiment of the disclosure. The exemplary communication device 120, 130, 140 may include a bus 210, a processor 220, a memory 230, a read only memory (ROM) 240, a data provenance information analysis unit 250, a user interface 260, and a communication interface 270, and output devices 280. Bus 210 may permit communication among the components of the communication device 120, 130, 140.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Memory 230 may include an internal or external storage device that may include any type of media, such as, for example, magnetic or optical recording media and its corresponding drive.

User interface 260 may include one or more conventional input mechanisms that permit a user to input information, communicate with the communication device 120, 130, 140 and/or present information to the user, such as a an electronic display, microphone, touchpad, keypad, keyboard, mouse, pen, stylus, voice recognition device, buttons, one or more speakers, etc. Output devices 280 may include one or more conventional mechanisms that output information to the user, including a display, a printer, one or more speakers, or a medium, such as a memory, or a magnetic or optical disk and a corresponding disk drive.

Communication interface 270 may include any transceiver-like mechanism that enables the communication device 120, 130, 140 to communicate via a network. For example, communication interface 270 may include a modem, or an Ethernet interface for communicating via a local area network (LAN). Alternatively, communication interface 270 may include other mechanisms for communicating with other devices and/or systems via wired, wireless or optical connections. In some implementations of the communication device 120, 130, 140, communication interface 270 may not be included in the exemplary communication device 120, 130, 140 when the communication process is implemented completely within the communication device 120, 130, 140.

The communication device 120, 130, 140 may perform such functions in response to processor 220 by executing sequences of instructions contained in a computer-readable medium, such as, for example, memory 230, a magnetic disk, or an optical disk. Such instructions may be read into memory 230 from another computer-readable medium, such as a storage device, or from a separate device via communication interface 270.

The communication network environment 100 and the communication devices 120, 130, 140 illustrated in FIGS. 1 and 2 and the related discussion are intended to provide a brief, general description of a suitable computing environment in which the disclosed embodiments may be implemented. Although not required, the disclosed embodiments will be described, at least in part, in the general context of computer-executable instructions, such as program modules, being executed by the communication device 120, 130, 140, such as a general purpose computer. Generally, program modules include routine programs, objects, components, data structures, etc. that perform particular tasks or implement particular abstract data types. Moreover, those skilled in the art will appreciate that other embodiments of the disclosed embodiments may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 3:
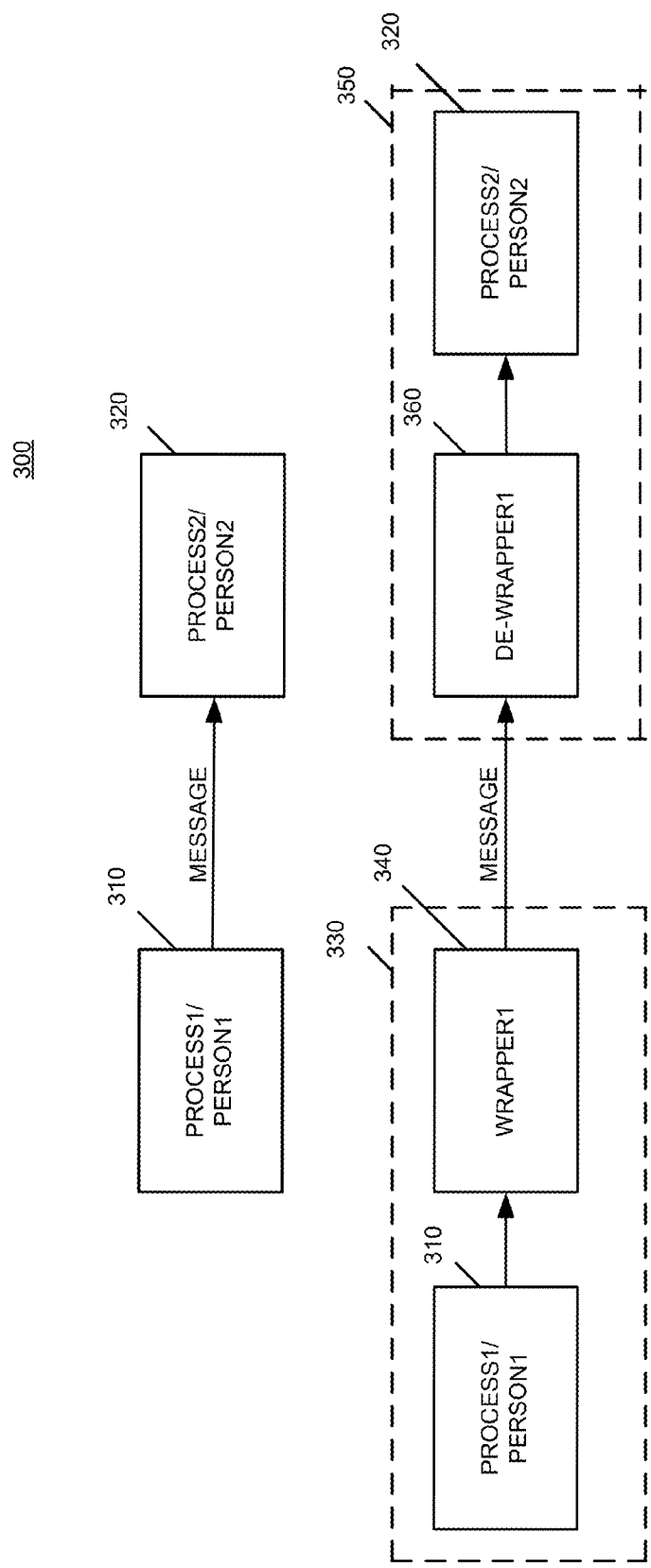
FIG. 3 is a block diagram of the wrapping and de-wrapping process in accordance with a possible embodiment of the disclosure.

FIG. 3 is a block diagram of the wrapping and de-wrapping process 300 in accordance with a possible embodiment of the disclosure. A possible system level objective while adding data provenance information is to do it with minimal impact on an existing workflow. The existing workflow is shown at the top as a message being sent from process 1/person1 310 to process2/person2 320.

In the disclosed embodiments, wrappers 340 may be used in the message sending process 330 that will add the appropriate data provenance information and a de-wrapper1 360 will be used in the message receiving process 350 that will strip the data provenance information before the message reaches its destination.

Note that the data providence architecture of the disclosed embodiments may be a peer-to-peer architecture or a service oriented architecture, for example.

Figure 4:
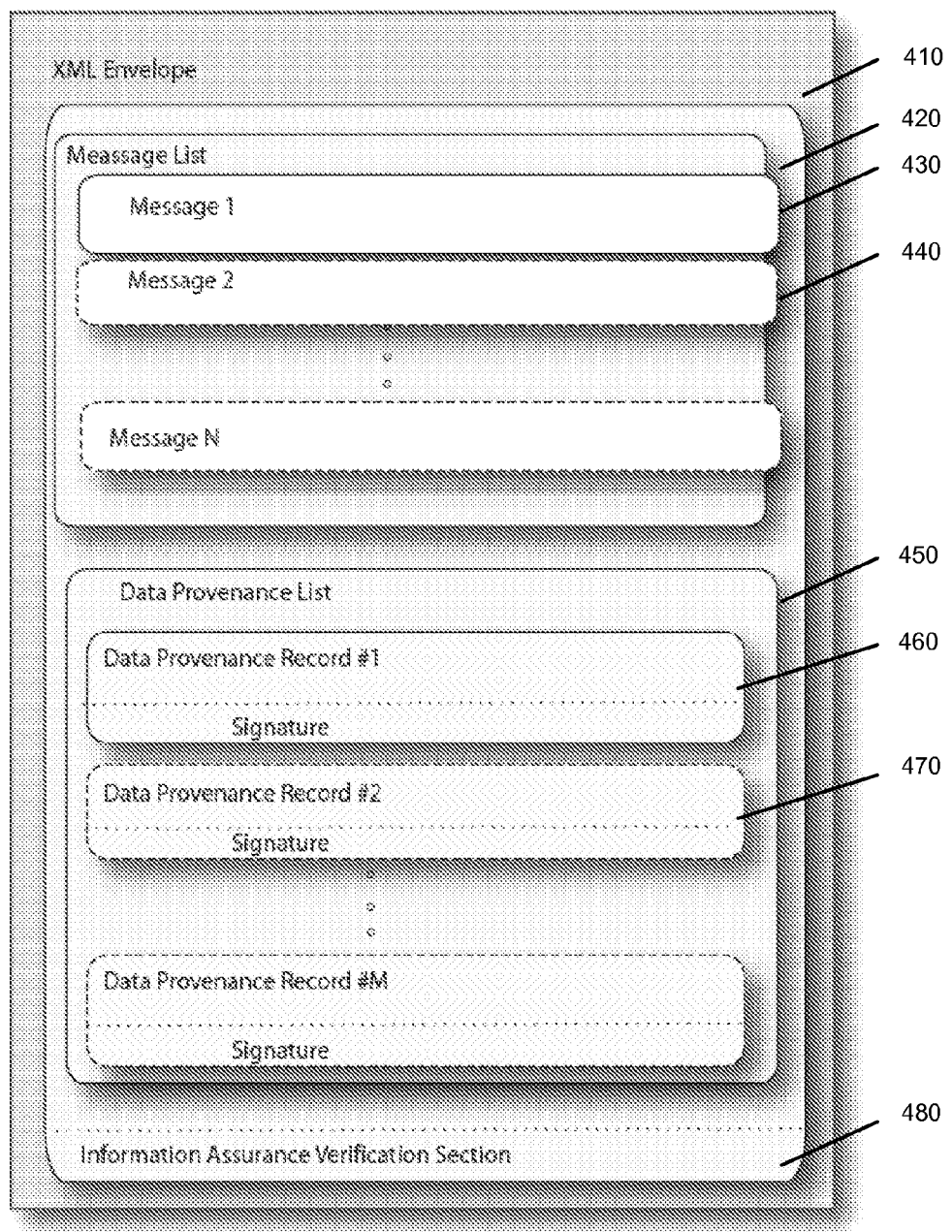
FIG. 4 is a diagram of an exemplary message envelope in accordance with a possible embodiment of the disclosure.

FIG. 4 is a diagram of an exemplary message envelope 400 in accordance with a possible embodiment of the disclosure. The exemplary message envelope 400 may include an envelope 410, a message list 420, one or more messages 430, 440, a data provenance list 450, one or more data provenance records 460, 470 that correspond to the one or more messages 430, 440, and an information assurance verification section 480. The exemplary data provenance record 400 may also include one or more attachments, as discussed below in relation to FIG. 5.

A system providing data provenance may include two types of information components:
  A message list (messages in a list format which may include attachments)
  Data provenance records The message list may be a list of messages. There may be at least one message and one data provenance record. However, the data provenance records may be created in parallel of an existing workflow. For example, the data provenance records can be created at a higher security level than the messages. Attachments may be included in this list.

The message body may be the data being sent. It may be text, images, etc. Each message may have a unique message-identification (ID) value. Attachments may be considered messages as well therefore; they may also have a unique message-ID.

Attackers may attempt to fabricate and modify messages. The data provenance verification may detect these attempts if proper information is available. However, it is important that different messages do not have identical message-ID values.

Note that one way to reduce the risk of collisions of message-ID's is to force each entity to have a unique name, and to base the message-ID on the entity name combined with a value—either based on date and time, or based on a monotonically increasing integer. The disclosed embodiments may have the ability to archive and retrieve messages based on the message-ID value so that someone may verify the data provenance with first-hand investigation.

Note that the message may include a variant part and an invariant part (note, however, that it may be possible that the entire message will be invariant). The variant part may contain information that changes such as, for example, the routing information as the message is forwarded.

The invariant part may always contain the same values. The data provenance information may include information from the invariant part of the message. For example, hash algorithm identification information and a hash value may be data provenance information that are included in the invariant part of the message. Any system that retrieves the message, and calculates a one-way hash of that message, will always get the same value.

When the invariant part is described, it is important to note that it is the components that are invariant. The process may store the components in multiple places, and the message body may not even be part of the data provenance record. But in validating the data provenance record, these components must be re-assembled into a known order, and the hash can therefore be calculated, Certain fields may be contained inside the invariant section of the message. These fields may be included when the hash of the message is calculated, and therefore may be authenticated. Some of the fields may include:
  Message-ID
  Creator of the message (e.g. From) (Note: The creator of the message may be part of the message-ID. For instance, if it comes from a machine, the message-ID might be created by concatenating the machine name and the timestamp.)
  Security Label: This field may contain the security classification as specified by the creator. Could be left undefined.
  To—the destination—by name or by role (while both of these fields could be null, it is assumed for this discussion that at least one is non-null. If both are specified, applications may determine how to handle possible inconsistencies. The process may have a similar structure for the From field.)
  References: Any message-ID values of attached messages.
  Message-Body—The contents of the message (may also be stored elsewhere).
  Message Body Type—(Optional) used to distinguish between binary and ASCII.
  MIME-Type—(Optional) Useful to display binary information.
  Timestamp—(Optional) May reduce the risk of a replay attack.

Variant fields might change when routing is applied. That is, the value of these fields may change as messages are routed through the workflow process. Examples might include:
  Route List—may be used for source routing
  Next Hop Destination—Might change when messages are routed.

The information assurance verification section of the message list may be used to verify the security attributes of the contents of the message (confidentiality, authenticity, integrity, non-repudiation, etc.), and would be provided by the SOA security stack. For example, if used for authentication, the information assurance verification section may contain a signature of the contents of the message list. If used for encryption, the information assurance verification section may include a reference to the encryption key.

Since data provenance records may reference one or more data provenance records, the actual data structure for a message may be complex (i.e., contain attachments). However, consider a single data provenance record of a message with no attachments. This process corresponds to a sender transmitting a message to a receiver; and so there are two different perspectives of any single message transmission—outgoing and incoming.

The outgoing perspective may be the intended transport data provenance characteristics from the perspective of the sender. The incoming may be the observed transport properties from the receiver's perspective. The appropriate party may sign each perspective. The receiving perspective may include the outgoing (intended) perspective. Therefore, the receiving party may sign the data provenance record from the sending party.

The sender's data provenance section may include the following pieces of information Message-ID—this must be unique. This may also provide enough information for someone who wishes to verify the data provenance record to retrieve the message.

Outgoing Security Attributes—These are the security characteristics of the message from the sender's perspective. This may include measurements of confidentiality, authenticity, and integrity (may also include channel availability).

Timestamp—This might be optional, but is recommended as it provides extra protection for availability and non-repudiation analysis. Note that information that is more accurate may be obtained with a synchronized clock.

Owner of the signature—This may provide information to someone who wishes to verify the signature.

Hash of the Invariant part of the message—If one were to obtain the message specified by message-ID, and perform a one-way hash function as specified in the next field, this field may store the resulting value. Note that it may include all of the fields in the invariant section, for example.

The Hash Algorithm used—Given this information, and the message, someone may obtain the message, calculate the hash, and see if it agrees with the hash value in the data provenance record.

Security Label—To simplify data classification of a multipart message.

Optional Information—As needed for specific applications.

Note that there may be benefits of including the recipient's name in the sender's data provenance section, as that would allow a recipient to check if the message was intended for him/her and not that he/she received it due to some error or deliberate intent. This is importance especially when the message recipient is determined as it is forwarded and the real recipient information is in variant part which can easily be modified without detection.

The sender's data provenance information may be used to verify the data provenance of a message. That is, if one obtained a message referred to by the record, combined with this record, they may verify that the creator of the record saw the message (or at least makes the claim that they saw the message) whose hash is inside the data provenance record. That is, one may decrypt the signature using the public key of the owner, and the results should match the hash of the invariant part of the message.

Some of the information may be missing, however. For instance, suppose a sender does not provide any data provenance information to a receiver. The receiver may fill in empty values into the appropriate fields. This might happen in case an embedded system (such as an Unmanned Aerial Vehicle (UAV)) sends information from the sensor to an Automatic Target Recognition (ATR) system. The receiver may provider the sender's ID in the record, leave the hash and signature blank, fill in its section, and sign the resulting information.

Note that the message ID of the attachment may not need to be specified in this data provenance record, as it may be specified inside the message itself. Some implementations may wish to include references to messages inside the data provenance record.

Note also that the user and/or the application may sign the data provenance record. The XML stack may perform the signature in the XML envelope, for example. Therefore, the certificates and the signing algorithm might differ. The signature for the data provenance might be performed by a multi-purpose private key, or a dedicated key may be used, for example. However, some systems may lack the ability to sign a document, and as such, the signature information may be blank. The receiver may provide/modify the information if the data provenance record was not signed.

When receiving the message, the receiver may add data provenance information for analysis. The data that may be signed by the receiver may include the sender's signed information, for example. The data (and function) of the receiver's data provenance record may be similar to the sender's data provenance information. However, the information may not include the message ID because that information is included in the sender's data provenance information. By having the receiver sign the sender's data provenance record, the process may provide non-repudiation in case the sender denies sending the message.

The hash value and algorithm may be included in case the sender and receiver use different hash algorithms (or if the sender does not provide the information).

After a message is transmitted (that is, it goes from the sender to receiver), a completed data provenance record may be created. To simplify the parsing of the data provenance records, the sender may transmit a completed data provenance record, but with the receiver's section blank. When the receiver accepts the message, it may complete its section and sign the record. This process may waste bits but may simplify the implementation.

The data provenance information may be used towards each of the information assurance attributes. These information assurance attributes can be used to address various attacks as set forth below.

Authenticity: Since each data provenance record may be signed by the sender, anyone receiving the message may:
1. Examine the message;
2. Calculate the hash of the message using the same algorithm as specified by the sender;
3. Obtain the name of the user from the data provenance record;
4. Verify that the name of the user is also inside the message as well (so that someone can not pretend to be the author) and make sure they agree;
5. Encrypt the hash with the public key of the sender; and
6. Determine if the hash value agrees with the one stored inside the data provenance record.

Integrity: Since a hash function is a one-way calculation based on the contents of the message, it may be used to verify the integrity. If the authentication step is done, the integrity may also be checked. Note that integrity may be checked even if the data provenance record is not signed. However, the sender of the information may not be validated. One may just ensure the message arrived intact because the receiver and the sender validate the hash values. The final recipient may also verify if what was received is the same message as the one sent by original source, by verifying that the hash values are identical.

Confidentiality: It may be impossible to verify that a message is confidential, as a true attack may be completely passive, and cannot be measured. A secure channel may have a covert monitoring device. However, one can verify that the sender intended to send a message using an encrypted channel or if due to some error, a message was received that was not confidential.

Since there is a data provenance record for every hop, each hop may be examined independently to ensure all information assurance attributes. However, if integrity is needed, but not authenticity, only the first and last hop may be examined. If any of the hops were not encrypted, then there may have been an unintentional exposure of confidential information.

There may be four conditions that may be examined at each hop:

TABLE 1

Encryption Perspective over a Hop

| Case # | Sender's perspective | Receiver's Perspective | Conclusion |
| --- | --- | --- | --- |
| 1 | Encrypted | Encrypted | Encrypted |
| 2 | Encrypted | Unencrypted | Error or Attack |
| 3 | Unencrypted | Encrypted | Error or Attack |
| 4 | Unencrypted | Unencrypted | Unencrypted |

In Case 1, the conclusion may be that the message was transmitted encrypted, to the best knowledge of the participants. Either one may publish the information using another channel, for example. However, if one party published the information, the other may not detect this by examining the data provenance records.

In Case 4, both parties may conclude that the message was not sent in a confidential form.

In Case 2, the receiver may receive a message that was encrypted but arrived unencrypted. This situation may indicate a bug in the implementation, or if the message cannot be authenticated, it may be an intrusion, such as replay attack or a man-in-the-middle attack, for example.

In Case 3, the message was sent unencrypted, but is received encrypted. This situation may indicate either be an implementation error, the sender is mistaken, or a man-in-the-middle attack with the input unencrypted but with the output that is encrypted, for example. One instance may involve a dumb device transmitting a message using a secure communication channel, but the receiver is more sophisticated and knows the channel is secure, for example. In this case, the receiver may state the channel was secure because it has additional knowledge, or more sophistication, than the sender.

Both case 2 and 3 may also occur if either party intentionally lies about the characteristics. Someone might accuse the other party that they made a mistake, and lied about the characteristics to provide "evidence." Unfortunately, there may be no way to determine which party is fabricating information without an observation from a third party (log files, etc.).

If no logs or third party auditing is done then that may potentially cause a problem. One could create a data provenance record on a data provenance record to make sure it has not been tampered with. However, this process may only protect the data about the transmission, and not the data that was transmitted.

If multi-hops occur, the entire chain from origination source to destination may have to be examined. If there are discrepancies, they may have to be resolved. External knowledge may be necessary to properly evaluate the risk of eavesdropping, for example.

Non-Repudiation: The data provenance records, by their very nature, may provide protection from non-repudiation. Since the data provenance records may be signed, it may be difficult for someone to retract this statement. For example, someone could send a message, and then claim that their key was compromised. One may have to examine the sequence of events to determine if the retraction occurred while the key was considered secure or not. One could also claim the message was not sent at the time that was logged. However, the receiver places a timestamp on the message, and then signs it, so it becomes harder for the sender to lie about the time the message was sent.

The timestamp may also be useful in dealing with compromised and expired certificates. Someone can claim that their digital signature has been compromised. The timestamp may provide a timeline of any activity, which may be used to verify any claims.

Availability: There may be two different ways this architecture can be used to detect attacks on availability. The first approach may assume the data provenance analyst knows historical information about transmission times. The second approach may be used if the data provenance system provides historical information along with the record.

In the first approach, the data provenance records, if the timestamp is included, may provide the information to determine the total transmission time for each hop. There are two transmission models that may be used, reliable and unreliable. If a reliable transmission model is used, (e.g. TCP) then the sender may include in the data provenance record at the time it was initiated. The receiver may record the time the message arrived. The difference between these two times may provide the total transmission time. If the "typical" time is, 5 minutes for example, and one of the data provenance records indicates the arrival time was 5 hours, this might be an indication of some attack (or some other system problem), for example.

If an unreliable transmission model is used (e.g., User Datagram Protocol (UDP)), then there may need to be historical information to determine if there is a problem. For instance, if the data provenance record indicates the source normally sends out a report every 15 minutes, then if one examined the record for a time period, and counted how many times reports arrived during that time, this information might indicate an attack. In another instance, if the previous report was 2 hours ago, and there should have been 8 reports during this period, but only one arrived, then perhaps an attack occurred.

Another way to detect attacks may be to have a monotonically increasing value. That is, if each report had a number, such as 1, 2, 3, 4, 5, . . . and the current report has a value of 22, then if there was no record of report 21 arriving, then this might indicate an attack.

A second mechanism may be used to detect availability, but this mechanism may require knowledge of the sender and/or the receiver. If we assume that the sender and/or receiver have knowledge about the availability from their perspective, they may include this information in the data provenance records. For example, if a receiver is getting transmission errors, the number of retries needed to receive a message may double. If the receiver included this information in the data provenance record, the data provenance analyzer may use this information, and past knowledge, to consider whether there was an attack on availability.

Replay and Freshness: The data provenance analysis may also detect replay attacks. There may be two mechanisms that can be used.

The first mechanism may be the analysis of the timestamp records. This process assumes knowledge of previous transmissions. Someone could capture and intercept a message, and retransmit it later, for example. If scenario occurred, the data provenance record would have a timestamp that may be much earlier that expected. In this example, the scenario may be very similar to an attack on availability, as the message may be simply delayed. The difference may be a question of degree to distinguish between a delaying attack (on availability) and a replay attack if the receiver has no way to detect old messages. Also, note that a variation may cause packets to arrive out of order. Unusual activity may also indicate some sort of attack.

If the receiver or data provenance analysis keeps track of messages, and can detect messages that have arrived earlier, then it may become easier to detect a true replay attack, assuming the transmission mechanism does not create duplicate messages.

Figure 5:
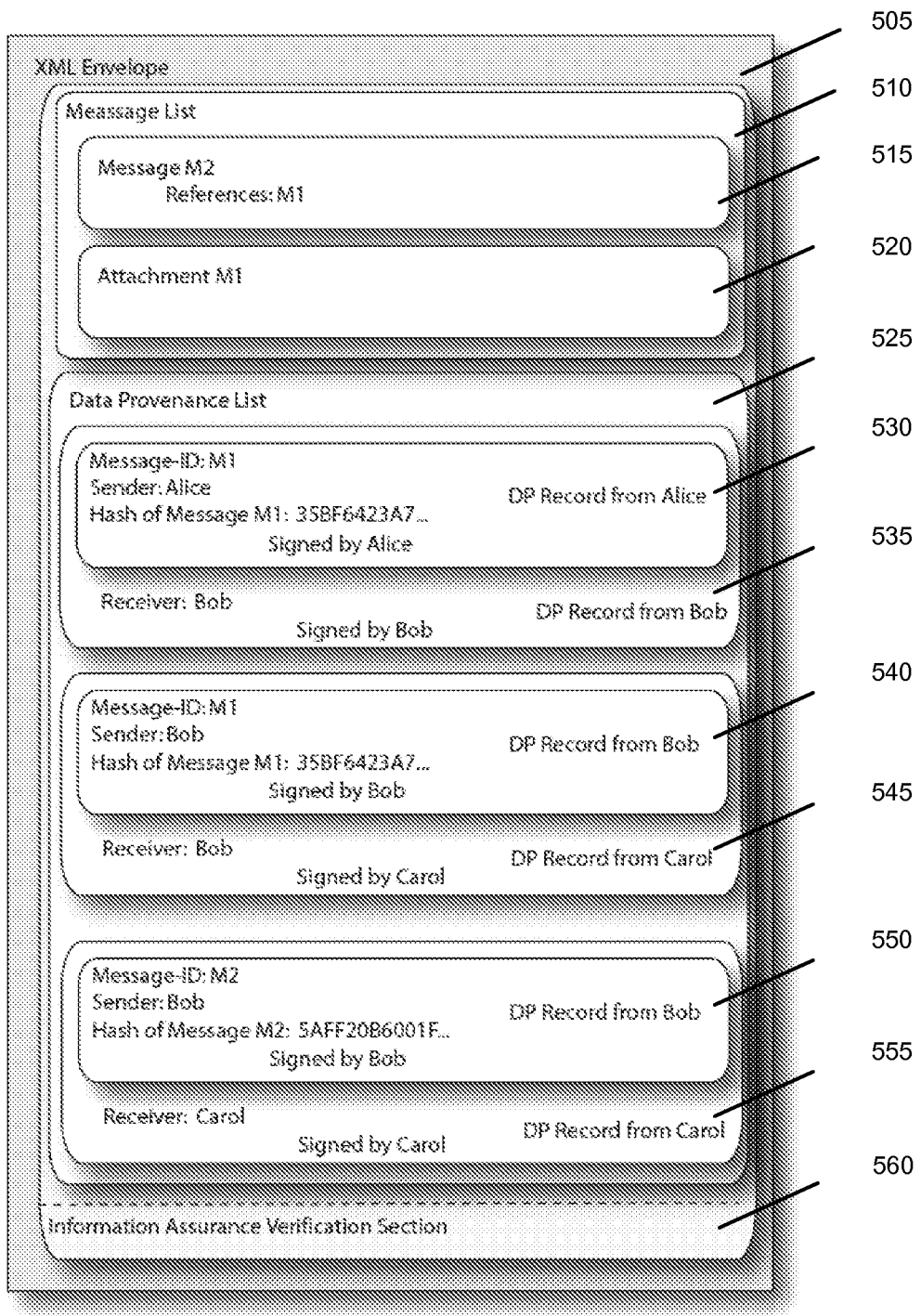
FIG. 5 is a diagram of an exemplary message envelope with attachments in accordance with a possible embodiment of the disclosure.

FIG. 5 is a diagram of an exemplary message envelope 500 with attachments in accordance with a possible embodiment of the disclosure. The exemplary message envelope 500 may include an envelope 505 and within the envelope the information assurance verification section 560 and within that, a message list 510, one or more messages 515, one or more attachments 520, a data provenance list 525, and one or more data provenance records 530/535, 540/545, 550/555 that correspond to the one or more messages 515 and/or attachments 520.

In each transmission of a message, there may be multiple data provenance records added. In the case of a message being forwarded unchanged, then each hop may provide a data provenance record, for example. Forwarded messages may occur if the message is unchanged, for example. In other words, in the case of workflow routers, or someone who uses a messaging service, a data provenance record may be added even though the message is unchanged.

For instance, if Alice sends a message M1 to Bob, who forwards it to Carol, who forwards it to Dave, then there may be 3 data provenance records sent with message M1 to Dave:

Alice to Bob of message M1
Bob to Carol of Message M1
Carol to Dave of Message M1

Since the message is unchanged, and potentially verifiable, this route information may not need to be retained. Therefore, Dave could accept the message from Carol, but create a data provenance record with Alice in the sender's section. The other records may be deleted in the data provenance record. For instance, if the route from Bob to Carol to Dave is though an encrypted tunnel in a MLS system, the data provenance records containing information about Carol and perhaps Bob could be removed. Carol may create a single data provenance record showing that Alice sent the message to Dave directly. However, the "To" information in the invariant portion of M1 may still remain and could identify Bob as the original recipient of M1. If the invariant part of the message did not include the intended receiver (i.e. the "To" field), it may be impossible to detect misrouted messages.

Alternatively, the entire data provenance record may be retained. This process may be important if the originating message was not signed and verified (i.e. from an untrusted source). In this scenario, the route from Alice to Bob, Carol and Dave may be important because Alice's ID could not be verified.

If the message is going from a high security level to a lower level, it may be necessary to remove all trace of the original source. This removal may be performed by creating a proxy author (alternatively, the security gateway might perform this creation), for example.

The second type of data provenance record may be one where a new message is created, with the previous message included or attached. If a device or person receives a message, and then forwards the message so the message is changed, it may create a new message and new message-ID. This message may identify the previous message by message-ID so any data provenance record associated with the included message may be found.

The disclosed embodiments may also support the analysis of the data provenance of complex messages. In other words, when Alice sends a message to Bob, who adds a note, and sends it with the original message attached to Carol, who forwards it to Dave, then Dave's system may be capable of performing a data provenance analysis of the data so as to determine the trustworthiness of the entire workflow.

This issue can be complex because data provenance is not a static event. Months later, one may wish to perform a data provenance analysis, and part of this analysis may concern non-repudiation. Certificates may have expired or be compromised between the original message and time that the analysis is performed. For instance, if Alice's certificate is compromised, then one may create false records of actions that Alice supposedly performed.

Another problem may be that messages may no longer exist, or may not be accessible by someone verifying the data provenance history. As an example, the record might have a different security classification. Therefore, one may not be able to retrieve the message to verify the hash. Instead, one may have to base a decision on the data provenance records of others.

A third issue may concern discrepancies between the sender's and receiver's security attributes. For example, Alice may send an encrypted message to Bob that is encrypted for confidentiality. Bob may receive the message, but claim that Alice purposely sent the message in clear text, thus violating security policy. Even though Alice has signed the document that makes claims about the transmission security attributes, Alice may insert incorrect information. Several solutions may be possible, but essentially the messaging system (such as XML) may act as a third party to resolve the issue.

Another issue may be the danger of a data provenance record being modified or changed after the fact. If a certificate is compromised, then someone who has the private key may fabricate data provenance records. This attack may allow an attacker to fabricate some of the fields, such as the security attributes of a received message. However, if the sender's attributes are signed, this fabrication may be detected by the process of the disclosed embodiments. In some cases, it might be necessary to create a data provenance record of receiving a data provenance record. However, note that data provenance records of data provenance records adds complexity, and it is not certain that this is needed in all cases.

Another implementation detail may be to ensure that when the data provenance analysis is done, all or some of the information may be available. Since some implementations may not have a mechanism to retrieve old messages, they also may not have a mechanism to retrieve old data provenance records. Therefore, a complete set of records may be provided that enables each receiver to analyze data provenance.

Messages may also contain attachments. FIG. 5 shows a message with an attachment M1. In this example, the attachment may have message-ID values, which are referenced in message 1. Note that if the number of messages is limited to one, with zero or more attachments, the first message may be the main message and the additional messages (2 . . . n) may be attachments. There may also be a message type, which is used to distinguish between messages and attachments.

Note that if a message is included, then the old message may be made into an attachment, and a new message is created which references it. Also note that since the message-ID of the attachment is specified inside the message, the attachment may not be included as part of the message. If the system has a message retrieval system, the attachment may be obtained later, for example.

For illustrative purposes, the operation of the data provenance information analysis unit 250 and the data provenance information analysis process will be described below in relation to the block diagrams shown in FIGS. 1-2.

Figure 6:
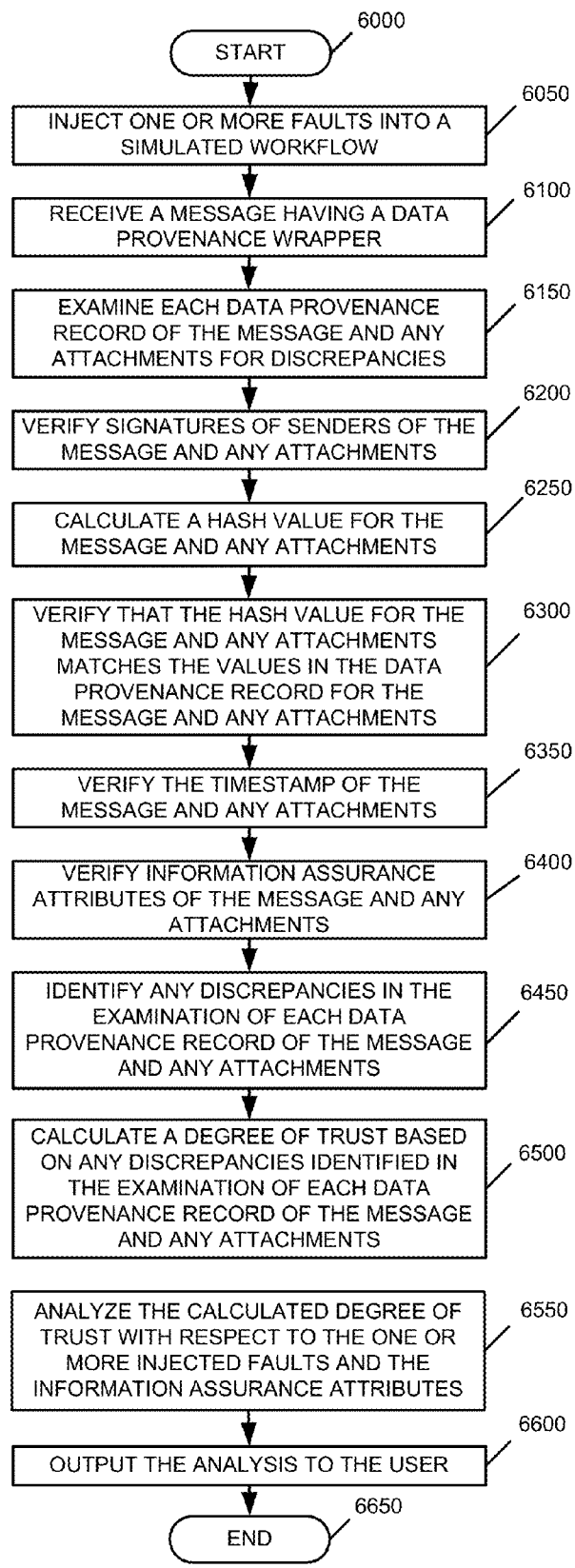
FIG. 6 is an exemplary flowchart illustrating one possible data provenance information analysis process in accordance with one possible embodiment of the disclosure.

FIG. 6 is an exemplary flowchart illustrating some of the basic steps associated with a data provenance information analysis process in accordance with a possible embodiment of the disclosure. The process begins at step 6000 and continues to step 6050 where the data provenance information analysis unit 250 may inject one or more faults into a simulated workflow.

Another issue is that security is often applied in layers, and that defense-in-depth is a desired attribute. Data provenance records can be kept for each layer of the network stack, and the calculation of the protection provide by the simulation can include the number of protection layers. A simulation can inject failures into a workflow, and the confidence in the information assurance attributes can be calculated based on the attributes of each layer. This way a simulation can determine the protection provided by a system with faults at multiple layers—and if these combination of faults can cause a failure where all layers of defense have failed. The simulation may show that a different architecture is more resistant to failures.

Figure 7:
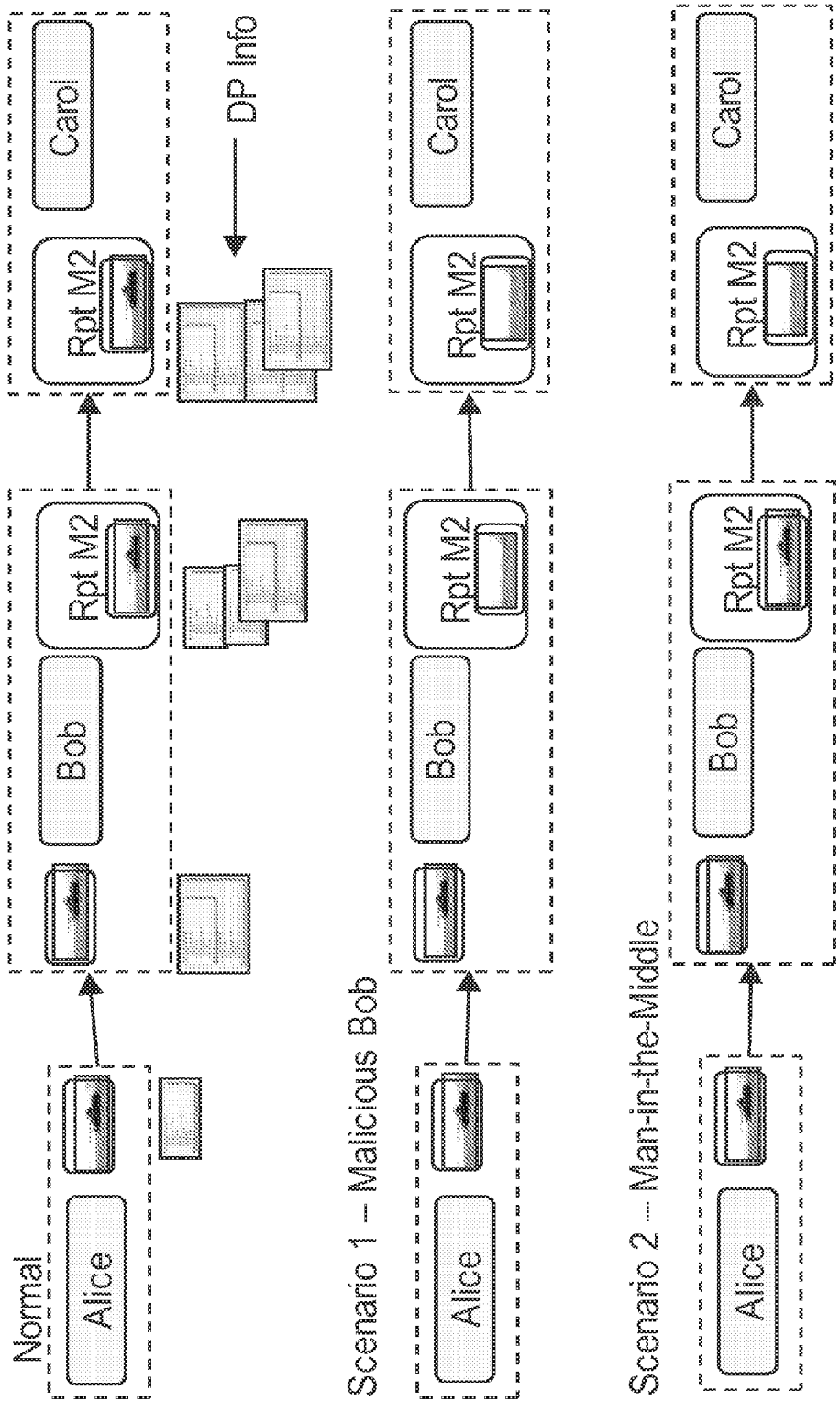
FIG. 7 is a diagram of an exemplary message workflow illustrating possible attacks in accordance with a possible embodiment of the disclosure.

FIG. 7 is a diagram of exemplary message workflows illustrating possible attacks in accordance with a possible embodiment of the disclosure. The diagram shows a normal workflow of a message traffic that travels from Alice to Bob and then to Carol. Scenario 1 illustrates a malicious attack by Bob or someone impersonating Bob. A malicious attack may be infiltration without the owner's informed consent of the message traffic flow that is intended to cause damage.

Scenario 2 illustrates a man-in-the-middle attack (or MITM). MITM may be a form of active eavesdropping in which the attacker may make independent connections with the victims and relays messages between them, making them believe that they are talking directly to each other over a private connection, when in fact the entire conversation is controlled by the attacker. The attacker may be able to intercept all messages going between the two victims and inject new ones. An MITM attack may only succeed when the attacker can impersonate each endpoint to the satisfaction of the other. In this example, Bob or a person impersonating Bob, has injected himself into the message traffic flow to intercept and/or alter the messages or attachments.

Although FIG. 7 only shows two possible attacks, the invention is not limited to simulating just malicious or MITM attacks and may simulate any attacks or threats known to those of skill in the art. In addition, the simulated workflow may allow threats and attacks to be modeled and studied to help develop techniques to prevent actual attacks. The simulated workflow may also allow for experimentation of different cryptographic techniques to prevent attacks.

At step 6100, the data provenance information analysis unit 250 may receive a message through the communication interface 270 having a data provenance wrapper. The received message may or may not have attachments and the data provenance wrapper may contain a data provenance record with data provenance information for the message and each attachment. The one or more injected faults may be included in the received message, the data provenance information, or at least one of the attachments, for example. In addition, the received message may be a simulated message or an actual message, for example.

The data provenance information may include message identification information, outgoing security attributes, timestamp, identification information of owner of signature, references, hash of an invariant part of the message, hash algorithm used, security label, authenticity objective information (based on processing device review), authenticity subjective information (based on human input), confidentiality objective information, confidentiality subjective information, integrity objective information, integrity subjective information, availability objective information, availability subjective information, and sender's signature, for example.

At step 6150, the data provenance information analysis unit 250 may examine each data provenance record of the message and any attachments for discrepancies. The examination may be conducted at each layer of the communication stack, for example. In order to examine each data provenance record of the message and any attachments, the data provenance information analysis unit 250 may perform steps 6200-6400 as set forth below.

At step 6200, the data provenance information analysis unit 250 may verify signatures of senders of the message and any attachments. At step 6250, the data provenance information analysis unit 250 may calculate a hash value for the message and any attachments.

At step 6300, the data provenance information analysis unit 250 may verify that the hash value for the message and any attachments matches the values in the data provenance record for the message and any attachments. At step 6350, the data provenance information analysis unit 250 may verify the timestamp of the message and any attachments.

At step 6400, the data provenance information analysis unit 250 may verify information assurance attributes of the message and any attachments, the information assurance attributes being at least one of authenticity, confidentiality, integrity, non-repudiation, and availability.

At step 6450, the data provenance information analysis unit 250 may identify any discrepancies in the examination of each data provenance record of the message and any attachments. At step 6500, the data provenance information analysis unit 250 may calculate a degree of trust based on any discrepancies identified in the examination of each data provenance record of the message and any attachments. At step 6550, the data provenance information analysis unit 250 may analyzes the calculated degree of trust with respect to the one or more injected faults and the information assurance attributes. At step 6600, the data provenance information analysis unit 250 may output the analysis to a user. The process may then go to step 6650 and end.

Embodiments within the scope of the disclosed embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosed embodiments may be applied to each individual user where each user may individually deploy such a system. This enables each user to utilize the benefits of the disclosed embodiments even if any one of the large number of possible applications do not need the functionality described herein. In other words, there may be multiple instances of the disclosed embodiments each processing the content in various possible ways. It does not necessarily need to be one system used by all end users. Accordingly, the appended claims and their legal equivalents should only define the disclosed embodiments, rather than any specific examples given.

We claim:

1. A method for simulating a workflow and analyzing the behavior of information assurance attributes through a data providence architecture, comprising:
   injecting, with a processor, one or more faults into a simulated workflow;
   receiving, with the processor, a message in the simulated workflow having a data provenance wrapper, the message including one or more attachments and the data provenance wrapper containing a data provenance record with data provenance information for the message and each of the one or more attachments, the one or more injected faults being included in at least one of the received message, the data provenance information, and at least one of the one or more attachments;
   examining, with the processor, each data provenance record of the message and the one or more attachments for discrepancies, the examination of each data provenance record of the message and the one or more attachments including:
      verifying signatures of senders of the message and the one or more attachments;
      calculating a hash value for the message and the one or more attachments;
      verifying that the hash value for the message and the one or more attachments matches values in the data provenance record for the message and the one or more attachments;
      verifying a timestamp of the message and the one or more attachments; and
      verifying information assurance attributes of the message and the one or more attachments, the information assurance attributes being at least one of authenticity, confidentiality, integrity, non-repudiation, and availability;
   identifying, with the processor, discrepancies in the examination of each data provenance record of the message and the one or more attachments;
   calculating, with the processor, a degree of trust based on security attributes and message identification information included in the message, the data provenance record and any discrepancies identified in the examination of each data provenance record of the message and the one or more attachments;
   analyzing, with the processor, the calculated degree of trust with respect to the one or more injected faults and the information assurance attributes; and
   outputting a result of the analyzing to a user in a form that is usable by the user.

2. The method of claim 1, wherein the data provenance information includes at least one of message identification information, outgoing security attributes, a timestamp, identification information of an owner of a signature, references, a hash of an invariant part of the message, a hash algorithm used, a security label, authenticity objective information, authenticity subjective information, confidentiality objective information, confidentiality subjective information, integrity objective information, integrity subjective information, availability objective information, availability subjective information, and a sender's signature.

3. The method of claim 1, wherein the received message is one of a simulated message and an actual message.

4. The method of claim 1, wherein the simulated workflow allows for experimentation of different cryptographic techniques.

5. The method of claim 1, wherein the one or more injected faults are one of a malicious attack and a man-in-the middle attack.

6. The method of claim 1, wherein the simulated workflow allows threats and attacks to be modeled.

7. The method of claim 1, wherein the message is received by at least one of a processing device, a mobile communication device, a portable computer, a desktop computer, a server, a network router, and a gateway device.

8. An apparatus that simulates a workflow and analyzes the behavior of information assurance attributes through a data providence architecture, comprising:
   a communication interface that facilitates sending and receiving of messages;
   a data provenance information analysis unit comprising a processor that is programmed to:
      inject one or more faults into a simulated workflow,
      receive a message in the simulated workflow having a data provenance wrapper,
      examine each data provenance record of the message and one or more attachments for discrepancies,
      identify discrepancies in the examination of each data provenance record of the message and the one or more attachments, calculate a degree of trust based on security attributes and message identification information included in the message, the data provenance record and any discrepancies identified in the examination of each data provenance record of the message and the one or more attachments, and analyze the calculated degree of trust with respect to the one or more injected faults and the information assurance attributes; and an output device that outputs a result of the analyzing to a user in a form that is usable by the user, the message having the one or more attachments and the data provenance wrapper containing a data provenance record with data provenance information for the message and each of the one or more attachments, the one or more injected faults being included in at least one of the received message, the data provenance information, and at least one of the one or more attachments; and in the examination of each data provenance record of the message and the one or more attachments, the data provenance information analysis unit (1) verifies signatures of senders of the message and the one or more attachments, (2) calculates a hash value for the message and the one or more attachments, (3) verifies that the hash value for the message and the one or more attachments matches values in the data provenance record for the message and the one or more attachments, (4) verifies a timestamp of the message and the one or more attachments, and (5) verifies information assurance attributes of the message and the one or more attachments, the information assurance attributes being at least one of authenticity, confidentiality, integrity, non-repudiation, and availability.

9. The apparatus of claim 8, wherein the data provenance information includes at least one of message identification information, outgoing security attributes, a timestamp, identification information of an owner of a signature, references, a hash of an invariant part of the message, a hash algorithm used, a security label, authenticity objective information, authenticity subjective information, confidentiality objective information, confidentiality subjective information, integrity objective information, integrity subjective information, availability objective information, availability subjective information, and a sender's signature.

10. The apparatus of claim 8, wherein the received message is one of a simulated message and an actual message.

11. The apparatus of claim 8, wherein the simulated workflow allows for experimentation of different cryptographic techniques.

12. The apparatus of claim 8, wherein the one or more injected faults are one of a malicious attack and a man-in-the middle attack.

13. The apparatus of claim 8, wherein the simulated workflow allows threats and attacks to be modeled.

14. The apparatus of claim 8, wherein the message is received by at least one of a processing device, a mobile communication device, a portable computer, a desktop computer, a server, a network router, and a gateway device.

15. A non-transitory computer-readable medium storing instructions which, when executed by a computer, causes the computer to execute a method for simulating a workflow and analyzing the behavior of information assurance attributes through a data providence architecture, the method comprising:

injecting one or more faults into a simulated workflow;
receiving a message in the simulated workflow having a data provenance wrapper, the message including one or more attachments and the data provenance wrapper containing a data provenance record with data provenance information for the message and each of the one or more attachments, the one or more injected faults being included in at least one of the received message, the data provenance information, and at least one of the one or more attachments;

examining each data provenance record of the message and the one or more attachments for discrepancies, the examination of each data provenance record of the message and the one or more attachments including:
  verifying signatures of senders of the message and the one or more attachments;
  calculating a hash value for the message and the one or more attachments;
  verifying that the hash value for the message and the one or more attachments matches values in the data provenance record for the message and the one or more attachments;
  verifying a timestamp of the message and the one or more attachments; and
  verifying information assurance attributes of the message and the one or more attachments, the information assurance attributes being at least one of authenticity, confidentiality, integrity, non-repudiation, and availability;

identifying discrepancies in the examination of each data provenance record of the message and the one or more attachments;

calculating a degree of trust based on security attributes and message identification information included in the message, the data provenance record and any discrepancies identified in the examination of each data provenance record of the message and the one or more attachments;

analyzing the calculated degree of trust with respect to the one or more injected faults and the information assurance attributes; and outputting a result of the analyzing to a user in a form that is usable by the user.

16. The non-transitory computer-readable medium of claim 15, wherein the data provenance information includes at least one of message identification information, outgoing security attributes, a timestamp, identification information of an owner of a signature, references, a hash of an invariant part of the message, a hash algorithm used, a security label, authenticity objective information, authenticity subjective information, confidentiality objective information, confidentiality subjective information, integrity objective information, integrity subjective information, availability objective information, availability subjective information, and a sender's signature.

17. The non-transitory computer-readable medium of claim 15, wherein the received message is one of a simulated message and an actual message.

18. The non-transitory computer-readable medium of claim 15, wherein the simulated workflow allows for experimentation of different cryptographic techniques.

19. The non-transitory computer-readable medium of claim 15, wherein the one or more injected faults are one of a malicious attack and a man-in-the middle attack.

20. The non-transitory computer-readable medium of claim 15, wherein the simulated workflow allows threats and attacks to be modeled.

21. The non-transitory computer-readable medium of claim 15, wherein the message is received by at least one of a processing device, a mobile communication device, a portable computer, a desktop computer, a server, a network router, and a gateway device.

\* \* \* \* \*